United States Patent [19]

Kyle

[11] Patent Number: 4,899,144
[45] Date of Patent: Feb. 6, 1990

[54] METHOD OF TRANSMITTING ULTRASONIC AMPLITUDE & TIME TRAVEL INFORMATION OVER A LOGGING CABLE

[75] Inventor: Donald G. Kyle, Plano, Tex.

[73] Assignee: Atlantic Richfield Company, Los Angeles, Calif.

[21] Appl. No.: 291,522

[22] Filed: Dec. 29, 1988

[51] Int. Cl.4 .............................................. G01V 1/00
[52] U.S. Cl. .................................... 340/856; 340/858; 367/27; 367/29
[58] Field of Search ...................... 367/28, 29, 32, 34, 367/81, 82; 340/853, 856, 857, 858, 859; 364/422

[56] References Cited

U.S. PATENT DOCUMENTS 4,210,965 7/1980 Ingram ................................. 367/26
4,594,691 6/1986 Kimball et al. ...................... 367/32
4,777,629 10/1988 Morris et al. ..................... 367/29 X Primary Examiner—Brian S. Steinberger
Attorney, Agent, or Firm—Geoffrey A. Mantooth

[57] ABSTRACT

A method for transmitting ultrasonic amplitude and time travel information obtained from borehole logging operations over a logging cable allows accurate measurement of the time travel by surface equipment. The time travel information is transmitted by a time travel pulse, which is produced at a time interval from a synchronization pulse corresponding to the time of travel of an acoustic return. The peak amplitude of the acoustic return is transmitted by a separate amplitude pulse.

5 Claims, 3 Drawing Sheets

METHOD OF TRANSMITTING ULTRASONIC AMPLITUDE & TIME TRAVEL INFORMATION OVER A LOGGING CABLE

FIELD OF THE INVENTION

The present invention relates to methods for transmitting amplitude and time travel information over a logging cable, said information obtained from an ultrasonic logging apparatus.

BACKGROUND OF THE INVENTION

Zemanek, U.S. Pat. No. 3,369,626 discloses an ultrasonic tool for use in scanning the inner surface of an open well borehole or of casing in a borehole. The tool, which is commercially known as the "borehole televiewer", creates a high resolution picture of the inner surface under investigation. The borehole televiewer is used to "see" the inner surface under investigation through drilling mud or other borehole fluids. In an open borehole, the borehole televiewer provides a picture of the formations surrounding the borehole. In a cased borehole, the borehole televiewer provides a picture of the inner surface of the casing, which can be used to determine the condition of the inner surface.

The borehole televiewer uses a rotating ultrasonic transducer. The transducer serves as a transmitter, to generate acoustic waveforms, and a receiver, to receive the acoustic return. The acoustic return is caused by the reflection of the generated acoustic waveform from the inner surface under investigation. The acoustic return has two measured parameters, the time of travel of the acoustic return and the amplitude, which give an indication of the condition of the investigated surface.

The transducer rotates about three revolutions per second, is pulsed about 500 times per revolution, and is pulled up the borehole at a speed of about 5 feet per second. The ultrasonic transducer spot size, the rotational speed, the pulse repetition rate, and the vertical speed combine to provide full coverage of the investigated inner surface, resulting in high areal resolution of the inner surface.

The high resolution logging operations generate a tremendous amount of data. The data is transmitted uphole over a logging cable. Unfortunately, the logging cable has a limited bandwidth, thereby creating a potential bottleneck.

The borehole televiewer solves the problem of transmitting large amounts of data over the logging cable by transmitting the envelope of the acoustic return. The amplitude of the acoustic return is contained within the envelope information. The time of travel of the acoustic return is encoded by transmitting the envelope over the logging cable at a time interval from a synchronization pulse. The time interval corresponds to the time of travel of the acoustic return. The synchronization pulse is synchronous to the generated acoustic waveform from the ultrasonic transducer.

The surface electronics measures the amplitude of the acoustic envelope and the time interval of the acoustic envelope from the synchronization pulse. However, the logging cable degrades the rise time of the acoustic envelope, thereby affecting the time interval measurement by the surface electronics.

What is needed is a method of transmitting time of travel and amplitude information from an ultrasonic tool to surface electronics over a logging cable, which information is not degraded by the logging cable.

SUMMARY OF THE INVENTION

It is an object of the present invention to provide a method of transmitting time of travel and amplitude information from an ultrasonic acoustic return over a logging cable, which information is not degraded by the cable.

The method of the present invention provides transmitter means to transmit electrical signals over a cable connecting an ultrasonic logging apparatus to surface equipment. A synchronization signal is produced by said transmitter means and transmitted over the cable. The synchronization signal is synchronized with the generated acoustic waveform that produces the acoustic return. The time of travel and peak amplitude of the acoustic return are determined. A time travel signal is produced by the transmitter means and transmitted over the cable. The time interval between the synchronization signal and the time travel signal corresponds to the time of travel of the acoustic return. An amplitude signal is produced by the transmitter means and transmitted over the cable. The amplitude of the amplitude signal corresponds to the peak amplitude of the acoustic return.

By separating the time of travel information and the amplitude information into separate signals or pulses, the problems of transmitting the data over a cable with limited bandwidth are avoided. Furthermore, by making the time of travel and peak amplitude measurements on the actual acoustic return, rather than on the envelope, accuracy is increased.

In one aspect, the amplitudes of the synchronization signal and time travel signal are substantially similar. In another aspect, the amplitude signal is transmitted over the cable subsequent to the time travel signal.

DESCRIPTION OF PREFERRED EMBODIMENT

Figures 1, 2:
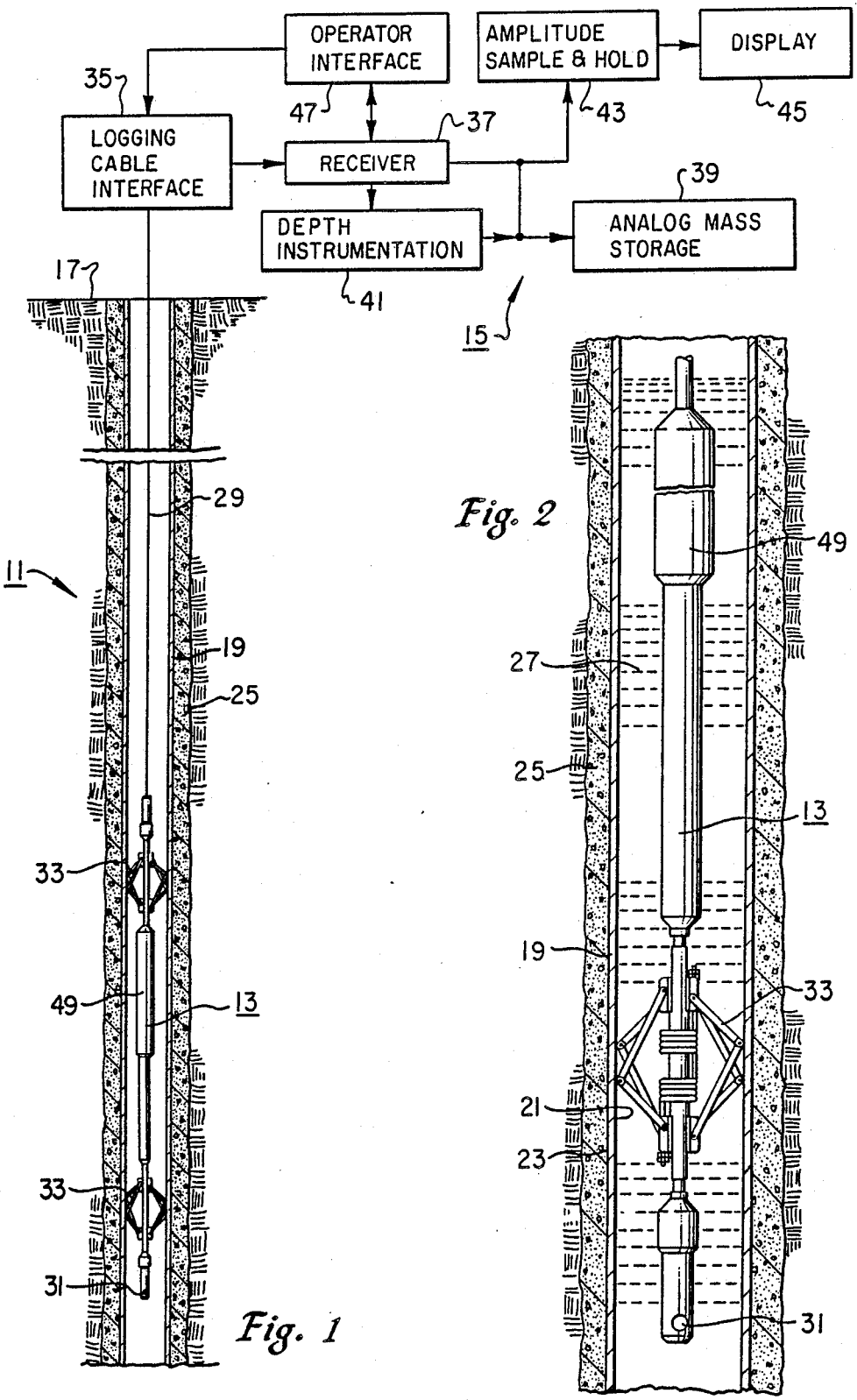
FIG. 1 is a schematic longitudinal cross-sectional view of a cased well borehole, showing an ultrasonic logging apparatus therein, and supporting surface equipment for the ultrasonic logging apparatus, with which the method of the present invention, in accordance with a preferred embodiment, can be practiced.
FIG. 2 is a detail view of the transducer portion of the ultrasonic tool of FIG. 1.

In FIGS. 1 and 2, there is shown a schematic longitudinal cross-sectional view of a cased well borehole 11, showing an ultrasonic logging apparatus 13 located therein, and supporting surface equipment 15, with which the method of the present invention, in accordance with a preferred embodiment, can be practiced.

The well borehole 11, which is drilled into the earth 17, is for producing oil or natural gas. The well borehole 11 is lined with a length of casing 19. The casing wall has inner and outer surfaces 21, 23. Cement 25 fills the annulus between the casing 19 and walls of the borehole 11, for at least some of the length of the casing. The cement 25 is used primarily to isolate one formation from another. The interior of the casing is filled with borehole fluids 27, which may be drilling mud, oil, or both.

The logging apparatus 13 is located within the casing 19 and moves up or down the borehole for logging operations. The logging apparatus 13 is suspended inside of the casing by a logging cable 29, which provides electrical power and communication channels from the surface equipment 15. The logging apparatus 13 includes an ultrasonic transducer 31, which, in the preferred embodiment, serves as a transmitter and a receiver. The transducer 31 is oriented so as to generate acoustic waveforms normal to the walls of the casing 19. In the preferred embodiment, the acoustical transducer has a resonant frequency of about 2 MHz and a bandwidth of about 1.0-2.5 MHz. The logging apparatus is kept centered along the longitudinal axis of the casing by centralizers 33.

The logging apparatus 13 transmits data uphole to the surface equipment 15 over the logging cable 29. The surface equipment 15 includes a logging cable interface 35, a receiver 37, an analog mass storage unit 39, depth instrumentation 41, an amplitude sample and hold 43, a display unit 45, and an operator interface 47. The logging cable interface 35 receives signals transmitted over the logging cable 29 from the logging apparatus 13, and transmits signals from the operator interface 47 to the logging apparatus over the logging cable. The receiver 37 amplifies and decodes the signals from the logging apparatus. The receiver 37 sends the appropriate amplified and decoded signals to the analog mass storage unit 39 for storage. The receiver also sends the appropriate signals to the amplitude sample and hold unit 43, which is used to display relevant information on the display unit 45. The operator interface 47 allows the operator to adjust parameters (such as amplifier gain) of the surface receiver 37 and the logging apparatus electronics portion 49. The logging data, comprising time of travel and amplitude information is typically stored in the analog mass storage unit 39 for subsequent processing. However, processing equipment (not shown) can be brought to the borehole site to allow on-site processing of the data.

Figure 3:
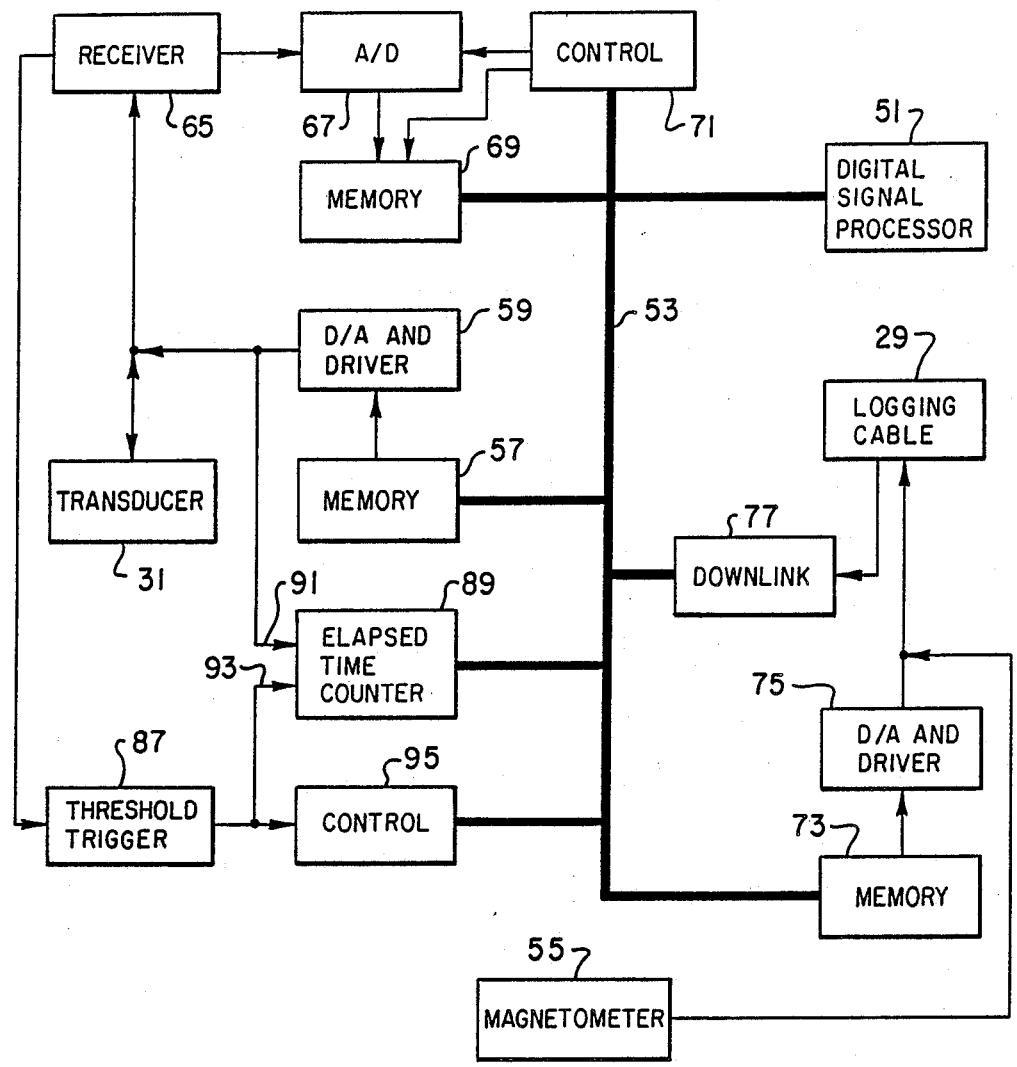
FIG. 3 is a block diagram of the downhole electronics unit which is located within the ultrasonic logging apparatus.

The electronics portion 49 of the logging apparatus 13, contains the downhole electronics (see FIG. 3). The downhole electronics interfaces with the transducer so as to produce and receive acoustic waveforms, and performs some preliminary processing of the data before being sent uphole. The electronics portion includes a digital signal processor 51, for performing control and processing functions. In the preferred embodiment, the digital signal processor is a TMS320C25 CMOS (complimentary metal oxide semiconductor) integrated circuit, manufactured by Texas Instruments. The digital signal processor is connected to the other units by way of a data bus 53. A magnetometer 55 provides information on the azimuthal orientation of the transducer 31 inside of the borehole 11.

The transducer 31 generates an acoustic waveform which is directed to the casing wall 19. The transducer 31 is excited by transmitter circuitry, which includes the digital signal processor 51, a transmitter memory 57, and a digital-to-analog (D/A) converter and driver 59. The digital signal processor 51 loads the transmitter memory 57 with a programmed waveform by way of the data bus 53. The transmitter memory 57, which is a first-in, first-out (FIFO) memory unit, outputs the programmed waveform to the D/A converter and driver 59. The D/A converter and driver 59 converts the digital waveform into an analog waveform and amplifies the waveform. The amplified waveform is sent to the transducer 31, where an acoustic waveform is generated. The transmitter circuitry excites the transducer on a periodic basis (e.g. 500 times per second).

Figure 4:
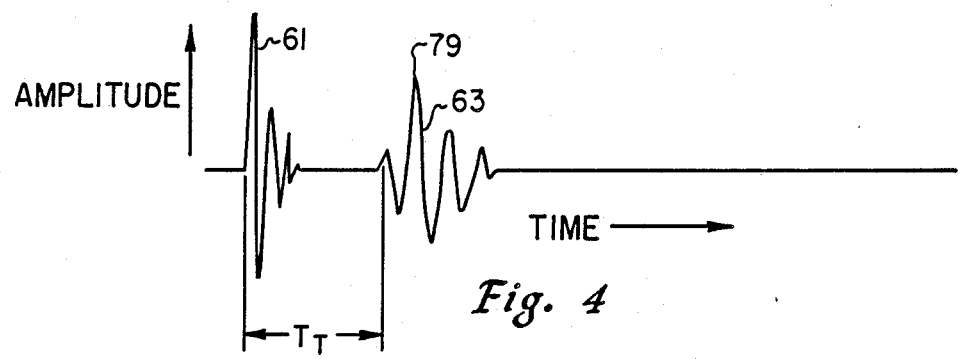
FIG. 4 is an ultrasonic waveform showing a transmitted waveform and its acoustic return.

The interaction of the generated acoustic waveform 61 on the casing wall produces an acoustic return 63 (see FIG. 4, where the amplitude of the acoustic return is not shown to scale with respect to the amplitude of the generated acoustic waveform). The acoustic return 63 includes a reflection portion which is caused by the reflection of the generated acoustic waveform 61 off of the inner surface 21 of the casing wall. The acoustic return is received by the transducer 31 and receiver circuitry. The receiver circuitry includes a receiver 65, an analog-to-digital (A/D) converter 67, receiver memory 69, and a control unit 71. The receiver 65 filters and amplifies the acoustic return. The receiver 65 includes circuitry for protecting its amplifier from the transmitted waveform sent to the transducer 31 by the D/A converter and driver 59. The acoustic return is sent from the receiver to the A/D converter 67 where the signal is digitized. The digitized acoustic return is loaded into the receiver memory 69 which is a FIFO memory unit. The control unit 71 controls the initiation and termination of the digitizing process.

Data is transmitted to and received from the surface equipment 15 over the logging cable 29 by way of a downhole logging interface. The logging cable interface includes a memory unit 73 and a D/A converter and driver 75 for transmitting data to the surface equipment, and a downlink unit 77 for receiving data from the surface equipment. The memory unit is a FIFO memory unit.

The acoustic return has two measured parameters, time of travel and amplitude, which give an indication of the condition of the investigated surface. Referring to FIG. 4, the time of travel $T_T$ is the time between the initiation of the generated acoustic waveform 61 and the detection of the acoustic return 63. The time of travel $T_T$ gives a measurement of twice the distance of the investigated inner surface 21 from the transducer 31. The amplitude is the peak amplitude 79 of the acoustic return 63, and gives an indication of the type of surface being investigated. In general, any irregularities on the investigated surface will reduce the amplitude of the acoustic return.

Figure 5:
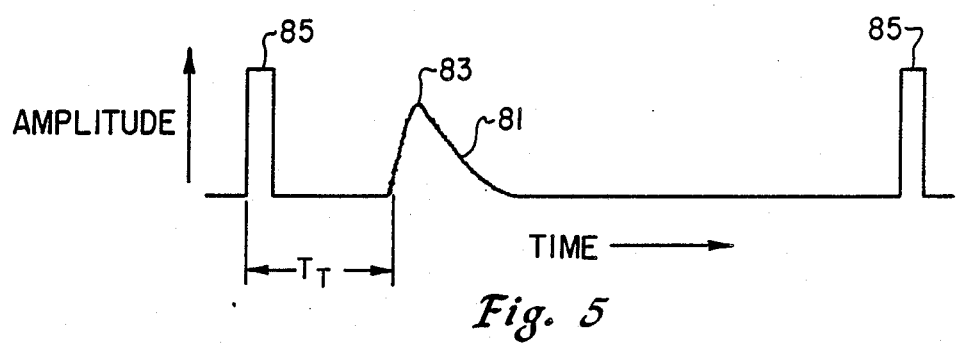
FIG. 5 is a prior art signal for transmission uphole over the logging cable.

In the prior art, the time of travel and amplitude information have been transmitted to the surface as shown in FIG. 5. The logging cable 29, which has a limited bandwidth, imposes a limit on the amount of data that can be transmitted uphole. Instead of transmitting the entire acoustic return, just the envelope 81 of the acoustic return is transmitted uphole. In the prior art, the peak amplitude 79 of the acoustic return is represented by the peak amplitude 83 of the envelope 81, and the time of travel $T_T$ is represented by the time between a synchronization pulse 85, which is synchronized with the transmitted acoustic waveform 61, and the leading detectable edge of acoustic return envelope 81. Unfortunately, transmission of the envelope over the logging cable distorts the rise time of the envelope, thereby affecting the time of travel measurement by the surface equipment 15.

In the method of the present invention, the time of travel of the acoustic return 63 is measured with the receiver 65, a threshold trigger 87, and an elapsed time counter 89. The elapsed time counter 89 receives a first input 91 from the output of the D/A converter and driver 59 and a second input 93 from the output of the threshold trigger 87. The threshold trigger 87 has an input connected to the receiver 65. The threshold trigger 87 is a programmable threshold comparator. When the D/A converter and driver 59 sends a pulse to the transducer 31, the first input 91 into the elapsed time counter 89 is triggered, starting the counter. Then, when the receiver 65 receives the acoustic return 63, the acoustic return is sent to the input of the threshold trigger 87, where the acoustic return is compared against the programmed threshold to detect when the acoustic return has occurred. If the threshold trigger 87 detects an input that is equal to or greater than its programmed threshold, then the threshold trigger produces an output signal. The output signal from the threshold signal is sent to the second input 93 of the elapsed time counter 89, which stops the counter. The time of travel information is the elapsed time between the occurrence of the first input 91 from the D/A converter and driver 59 and the occurrence of the second input 93 from the threshold trigger 87. The elapsed time counter 89 sends the time of travel information to the logging cable interface memory unit 73 over the data bus 53. The elapsed time counter 89 has a programmed maximum time delay between the occurrence of the first input and the occurrence of the second input, so that if the acoustic return is scattered by the inner surface, the elapsed time counter will stop counting, and reset itself to be ready for the next acoustic return. The threshold trigger 87 output also activates a control unit 95, which communicates with the receiver control unit 71 to initiate the digitization of the acoustic return.

The peak amplitude 79 of the acoustic return 63 is determined by the digital signal processor 51, which executes a peak finding or picking program. The program searches the digitized acoustic return time series for its maximum value, by comparing the amplitudes of the time samples with one another. The program can either search for the absolute peak amplitude or for the positive-most peak amplitude. The digitized acoustic return is sent to the digital signal processor 51 from the receiver memory 69 over the data bus 53.

Figure 6:
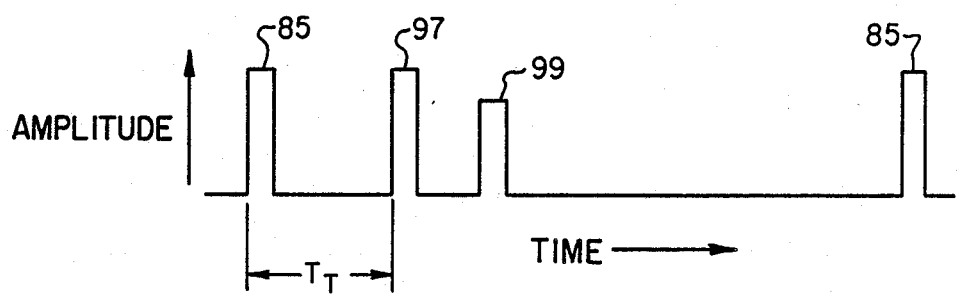
FIG. 6 is the signal produced by the method of the present invention for transmission uphole over the logging cable.

The digital signal processor 51 coordinates the sequence of transmission of data over the logging cable 29. As the digital signal processor 51 initiates the production of the generated acoustic waveform 61 with the transmitter memory 57 and the D/A converter and driver 59, the digital signal processor causes the logging cable interface memory 73 and the D/A converter and driver 75 to produce a synchronous pulse 85 for transmission over the logging cable (see FIG. 6). The synchronous pulse 85 has a leading edge that is synchronous with the leading edge of the transmitter pulse 61. Then, when the elapsed time counter 89 determines the time of travel, the digital signal processor 51 causes the logging cable interface memory 73 and the D/A converter and driver 75 to produce a time of travel pulse 97, for transmission over the logging cable 29. The time $T_T$ between the leading edges of the synchronous pulse 85 and the time of travel pulse 97 is the time of travel of the acoustic return 63. The amplitude of the time of travel pulse 97 is equal to the amplitude of the synchronous pulse 85. Next, the digital signal processor 51 causes the logging cable interface memory 73 and the D/A converter and driver 75 to generate an amplitude pulse 99, after the time of travel pulse 97. The amplitude of the amplitude pulse 99 is equal to the peak amplitude 79 of the acoustic return 61. The amplitude pulse 99 is produced at a sufficient length of time after the synchronous pulse 85 to insure that the surface equipment 15 can distinguish between the time of travel pulse 97, which moves in time relative to the synchronous pulse from one acoustic return to another, and the amplitude pulse 99. The surface equipment logging cable interface 35 and receiver 37 detect the synchronous pulse 85, the time of travel pulse 97, and the amplitude pulse 99.

By separating the time of travel information and the peak amplitude information, the problem of transmitting over the limited bandwidth logging cable 29 is overcome, thus providing data which is reliably measured by the surface equipment.

Although the method of the present invention has been described in relation to a cased borehole, the method can also be used with acoustic returns obtained from an open borehole. Furthermore, although the method of the present invention has been described in conjunction with digital equipment, the method can also be practiced with analog equipment.

Although the measurement of time of travel has been described by using a threshold detector, other methods of measuring the time of travel could be used.

The foregoing disclosure and the showings made in the drawings are merely illustrative of the principles of this invention and are not to be interpreted in a limiting sense.

I claim:

1. A method of transmitting data over a cable connecting an ultrasonic logging apparatus and surface equipment, said data derived from an acoustic return from the ultrasonic logging apparatus operating in a well borehole, said ultrasonic logging apparatus generating an acoustic waveform and receiving the acoustic return from said generated acoustic waveform, said acoustic return having a peak amplitude and a time of travel as measured from said generated acoustic waveform, comprising the steps of:

(a) providing transmitting means in said ultrasonic logging apparatus to transmit electrical signals over said cable;

(b) producing a synchronization signal with said transmitting means, said synchronization signal being synchronized with said generated acoustic waveform, and transmitting said synchronization signal over said cable with said transmitting means;

(c) determining the time of travel and the peak amplitude of said acoustic return;

(d) producing with said transmitting means a time travel signal at a time interval from said synchronization signal corresponding to the time of travel of said acoustic return, and transmitting said time travel signal over said cable with said transmitting means;

(e) producing an amplitude signal with said transmitting means, said amplitude signal having an amplitude corresponding to the peak amplitude of said acoustic return, and transmitting said amplitude signal over said cable with said transmitting means.

2. The method of claim 1 wherein the amplitudes of said synchronization signal and said time travel signal are substantially similar.

3. The method of claim 2 wherein said amplitude signal is transmitted over said cable subsequent to said time travel signal.

4. The method of claim 1 wherein said amplitude signal is transmitted over said cable subsequent to said time travel signal.

5. A method of transmitting data over a cable connecting an ultrasonic logging apparatus and surface equipment, said data derived from an acoustic return from the ultrasonic logging apparatus operating in a well borehole, said ultrasonic logging apparatus generating an acoustic waveform and receiving the acoustic return from said generated acoustic waveform, said acoustic return having a peak amplitude and a time of travel as measured from said generated acoustic waveform, comprising the steps of:

(a) providing transmitting means in said ultrasonic logging apparatus to transmit electrical signals over said cable;

(b) producing an ultrasonic generated acoustic waveform for logging said well borehole, and receiving an acoustic return, said acoustic return resulting from the interaction of said generated acoustic waveform with the sides of said well borehole, said acoustic return comprising a reflection portion;

(c) determining the time of travel and the peak amplitude of said reflection portion;

(d) producing a synchronization signal with said transmitting means, said synchronization signal being synchronized with said generated acoustic waveform, and transmitting said synchronization signal over said cable with said transmitting means;

(e) producing with said transmitting means a time travel signal at a time interval from said synchronization signal corresponding to the time of travel of said acoustic return, and transmitting said time travel signal over said cable with said transmitting means;

(f) producing an amplitude signal with said transmitting means, said amplitude signal having an amplitude corresponding to the peak amplitude of said acoustic return, and transmitting said amplitude signal over said cable with said transmitting means;

(g) providing surface receiving means, receiving said synchronization signal, said time travel signal, and said amplitude signal from said cable with said surface receiving means.

* * * * *